(12) United States Patent
Richard et al.

(10) Patent No.: US 7,393,880 B2
(45) Date of Patent: Jul. 1, 2008

(54) RADICALLY POLYMERIZABLE COMPOSITION RESULTING IN SHOCK RESISTANT ORGANIC LENSES

(75) Inventors: Gilles Richard, Alfortville (FR); Odile Primel, Vincennes (FR); Leanirith Yean, Longjumeau (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 333 days.

(21) Appl. No.: 10/496,743

(22) PCT Filed: Nov. 26, 2002

(86) PCT No.: PCT/FR02/04050

§ 371 (c)(1), (2), (4) Date: Dec. 9, 2004

(87) PCT Pub. No.: WO03/046028

PCT Pub. Date: Jun. 5, 2003

(65) Prior Publication Data

US 2005/0107537 A1 May 19, 2005

(30) Foreign Application Priority Data

Nov. 26, 2001 (FR) .................... 01 15273

(51) Int. Cl.
*C08F 2/46* (2006.01)
*C08F 2/50* (2006.01)

(52) U.S. Cl. .................... 522/96; 522/100; 522/103; 522/104; 522/107; 522/150; 522/152; 522/153; 522/154; 522/170; 522/173; 522/178; 522/180; 522/181; 522/182

(58) Field of Classification Search ........... 522/96, 522/90, 100, 103, 104, 107, 150, 152, 153, 522/154, 170, 173, 178, 180, 181, 182
See application file for complete search history.

(56) References Cited

U.S. PATENT DOCUMENTS

| | | | |
|---|---|---|---|
| 4,076,742 A | 2/1978 | Berlin et al. | 260/47 UA |
| 4,534,888 A | 8/1985 | Cobbledick et al. | 252/511 |
| 4,713,433 A | 12/1987 | Renzi et al. | 526/314 |
| 5,380,901 A | 1/1995 | Antonucci et al. | 556/440 |
| 5,807,906 A | 9/1998 | Bonvallot et al. | 522/182 |
| 5,880,171 A | 3/1999 | Lim et al. | 523/106 |
| 6,127,505 A | 10/2000 | Slagel | 528/61 |
| 6,177,507 B1 | 1/2001 | Calderada | 524/590 |
| 6,420,451 B1 * | 7/2002 | Lin et al. | 522/83 |
| 2002/0061993 A1 | 5/2002 | Gilles et al. | 526/261 |

FOREIGN PATENT DOCUMENTS

| | | |
|---|---|---|
| AU | 705542 | 12/1996 |
| EP | 0 114 080 | 7/1984 |
| EP | 0 241 997 | 10/1987 |
| EP | 0 453 149 | 10/1991 |
| EP | 0 745 621 | 12/1996 |
| EP | 1 035 142 | 9/2000 |
| FR | 2 765 583 | 1/1999 |
| WO | WO 98/36006 | 8/1998 |
| WO | WO 99/02574 | 1/1999 |
| WO | WO 01/09205 | 2/2001 |
| WO | WO 01/36507 | 5/2001 |
| WO | WO 01/36508 | 5/2001 |

OTHER PUBLICATIONS

Scott and Peppas, "Compositional effects on network structure of highly cross-lined copolymers of PEG-containing multiacrylates with acrylic acid," *Macromolecules*, 32:6139-6148, 1999.

* cited by examiner

*Primary Examiner*—Sanza L. McClendon
(74) *Attorney, Agent, or Firm*—Fulbright & Jaworski L.L.P.

(57) ABSTRACT

A radically polymerizable composition comprising:
a first component A comprising at least an oligomer having at least two radically polymerizable functions and the homopolymer of which has a glass transition temperature ($T_g$) lower than 50° C., such a component being able to result through polymerization in a (co)polymer having a glass transition temperature ($T_g$) equal to or lower than 50° C., preferably equal to or lower than 0° C. and more preferably ranging from −50° C. to −10 C., said oligomer accounting for more than 15%, preferably at least 20% of the total weight of the polymerizable monomers present in the composition; and
a second component B comprising at least a (meth)acrylic monomer having at least one H link promoting group, such a (meth)acrylic monomer accounting for at least 15% of the total weight of the polymerizable monomers and oligomers present in the composition when such a monomer is a methacrylic monomer and at least 35% of the total weight of such polymerizable monomers and oligomers present in the composition when such a monomer is an acrylic monomer.

37 Claims, No Drawings

RADICALLY POLYMERIZABLE COMPOSITION RESULTING IN SHOCK RESISTANT ORGANIC LENSES

This application is a national phase application under 35 U.S.C. § 371 of International Application No. PCT/FR02/04050 filed 26 Nov. 2002, which claims priority to French Application No. 01/15273 filed 26 Nov. 2001, the entire contents of both of which applications are incorporated herein by reference.

The invention generally relates to thermally photopolymerizable and/or polymerizable compositions, depending on the primer type being used for the reaction, resulting in transparent lenses, more particularly ophthalmic lenses, with a good shock resistance.

One of the best known organic lenses used for its excellent shock resistance properties is bisphenol-A polycarbonate, commonly referred to as PC, and the derivates thereof. Such a lens, being a thermoplastic material, is fully satisfactory for the wearer and can be produced at economical costs through injection by using injection moulding machines, perfectly well adapted to mass production.

When these are so-called prescription lenses, i.e. manufactured on demand depending on the correction to be applied to the lens wearer's eyesight, a previously injected semi-finished lens is being used, one face thereof already having its definitive geometry and the second face being then surfaced, followed by polishing operations using appropriate tools.

Polyurethane-polyurea based shock resistant material lenses have recently been marketed under the trade name TRIVEX®. The method for obtaining such lenses is disclosed in U.S. Pat. No. 6,127,505.

Other materials from the same chemical family, but incorporating sulphur to increase the refractive index, are disclosed in International Patent Applications WO 01/36.507 and WO 01/36.508.

Such materials are obtained through polycondensation by means of a tricky to implement method.

European Patent Application EP 1,035,142 discloses the polymerization of an acrylic copolymeric material for obtaining ophthalmic items comprising polymerisation of at least one α,β-ethylenically unsaturated carboxylic acid and of at least one aryl(meth)acrylate monomer in the presence of a cross-linking agent. The cross-linking agent, optionally accounting for 0.5 to 15% in weight of the total weight of the monomers present in the composition, more particularly comprises ethyleneglycol dimethacrylate, diethyleneglycol dimethacrylate, polyethyleneglycol dimethacrylate, allyl methacrylate, 1,3-propanediol dimethacrylate, allyl methacrylate, 1,6-hexanediol dimethacrylate, 1,3-butanediol dimethacrylate, 1,4-butanediol dimethacrylate, as well as divinyl compounds including divinyl hydrocarbons and divinyl benzene.

The examples in said Patent Application only mention the use, as a cross-linking agent, of ethyleneglycol dimethacrylate or 1,3-butanediol dimethacrylate.

The article by Robert A. SCOTT and Nicolas A. PEPPAS <<Compositional effects on network structure of highly cross-linked copolymers of PEG-containing multiacrylates with acrylic acid >> discloses a photopolymerisable composition containing PEG 400 diacrylate and 23.6% in weight of acrylic acid.

It would therefore be desirable to provide a radically polymerizable composition, more particularly through photopolymerization, resulting in a polymeric material having a high shock resistance, good thermomechanical properties, a low water absorbency and able to be used for manufacturing transparent substrates, in particular optical items such as ophthalmic lenses.

The above-mentioned technical problems are overcome according to the present invention by a radically polymerizable composition comprising:

a first component A comprising at least an oligomer bearing at least two radically polymerizable functions and the homopolymer of which has a glass transition temperature ($T_g$) lower than 50° C., such a component A being able to bring through polymerization to a polymer having a glass transition temperature ($T_g$)<50° C., preferably equal to or lower than 0° C. and preferably ranging from −50° C. to −10° C., the oligomer of the component A accounting for more than 15%, preferably at least 20% of the total weight of the polymerizable species present in the composition; and a second component B comprising at least one (meth) acrylic monomer having at least one H link promoting group, such a (meth)acrylic monomer accounting for at least 15% of the total weight of the polymerizable species present in the composition when such a monomer is a methacrylic monomer and at least 35% of the total weight of such polymerizable species when such a monomer is an acrylic monomer.

Preferably, the oligomer of component A is a difunctional compound.

Generally, the oligomer of component A has a number average molecular mass ranging from 100 to 5,000, preferably from 200 to 4000, more preferably from 300 to 2,000 g.mol$^{-1}$.

The oligomer of the first component A is preferably selected amongst poly(alkylene)glycols di(meth)acrylates, polyethoxy bisphenol-A di(meth)acrylate, dithio(meth)acrylate oligomers and urethane di(meth)acrylates, thiourethane di(meth)acrylates and di(meth)acrylate polysulfides.

The preferred polyalkyleneglycol di(meth)acrylates are polyethyleneglycol and polypropyleneglycol di(meth)acrylates, more particularly polypropyleneglycol di(meth)acrylates and most particularly, polypropyleneglycol dimethacrylates.

The preferred dimethacrylate oligomer is a polypropyleneglycol dimethacrylate with a number average molecular mass of about 530 g.mol$^{-1}$ (PPG 400 DMA) marketed under the designation SR644OP by CRAY VALLEY Corporation.

Such polyethylene- or polypropyleneglycol di(meth)acrylate oligomers suitable for the present invention can be represented by the following formula:

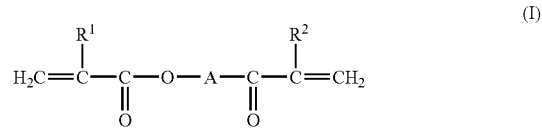

wherein $R^1$ and $R^2$ represent H or $CH_3$, A represents a divalent moiety with the formula:

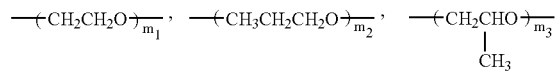

where $m_1$, $m_2$ and $m_3$ are each an integer ranging from 4 to 20.

When several oligomers (I) are used admixed together, a mean value can be defined:

$$\overline{m} = \sum_{m=4}^{20} X_m \cdot m$$

wherein $X_m$ is the weight ratio of the oligomer (I) for which A comprises m ethylene- or propyleneglycol patterns in its chain based on the total weight of the oligomers with formula (I) of the blend.

When as the first component A of the invention, commercial products are used that are already oligomer blends, such a value m is easily obtained performing a HPLC analysis of the blend t calculating the report:

$$X_m = \frac{S_m}{S_{total}}$$

where $S_m$ represents the surface of the peak corresponding to the monomer (I) comprising m propyleneglycol patterns in the divalent moiety A, and $S_{total}$ represents the total surface of all the peaks corresponding to the monomers (I) for which m ranges from 4 to 20.

According to the invention, blends of several polymers (I) are preferably used for which the mean value $\overline{m}$ such as defined hereinabove ranges from 5 to 10, preferably from 6 to 9.

However, it is possible to use blends of several oligomers (I) for which the mean value is higher than 20 and preferably ranges from 30 to 40. Calculating the mean value occurs as hereinabove, but for all the oligometric fractions, including of course for the oligomers (I) for which the value $\overline{m}$ is higher than 20. A commercially available oligomer exists for A=propoxy and $\overline{m}$=32.

Still preferably, the monomers (I) have a branched structure, i.e. the divalent moiety A represents:

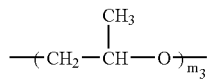

$m_3$ having the meaning as previously indicated.

The monomers (I) are commercially available from CRAY VALLEY Corporation under the commercial designations SR[644]OP, CD644OP and from SHIN NAKAMURA Corporation under the commercial designation 9PG and from the UCB Corporation under the commercial designation PPG400.

SR6440P is a blend of several monomers (I) the central pattern is as follows:

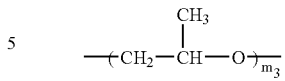

with $m_3$ as an integer having values ranging from 3 to 10 according to the following mass ratios:

| | |
|---|---|
| $m_3 = 3$ | 2% |
| $m_3 = 4$ | 8% |
| $m_3 = 5$ | 14% |
| $m_3 = 6$ | 20% |
| $m_3 = 7$ | 27% |
| $m_3 = 8$ | 19% |
| $m_3 = 9$ | 9% |
| $m_3 = 10$ | 1% | with a mean value $\overline{m}_3$=6.6.

Another di(meth)acrylate oligomer class suitable for the component A of the composition according to the invention includes the polyalkoxy (preferably ethoxy or propoxy) bisphenol-A dimethacrylates having from 10 to 80 alkoxy patterns (in mean value).

Amongst such bisphenol-A di(meth)acrylate compounds are to be mentioned the compounds represented by formula (II):

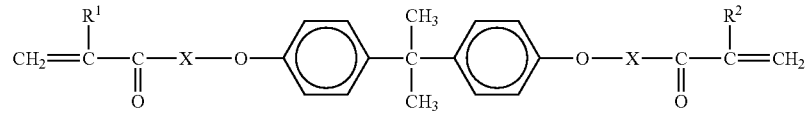

where $R^1$ and $R^2$ represent, independently from each other, H or $CH_3$, X represents $-(CH_2-CH_2-O)-$, $-(CH_2-CH_2-CH_2-O)-$ or $-(CH_2-CHCH_3-O)-$, preferably $-(CH_2-CH_2-O)-$, and $n_1+n_2$ has a mean value ranging from 10 to 50, preferably from 10 to 40.

Preferred compounds represented by the above-mentioned formula are those for which $R^1=R^2=CH_3$, $X=-CH_2CH_2O-$, and $n_1+n_2=10$ or $n_1+n_2=30$.

Preferred ethoxy bisphenol-A di(meth)acrylate oligomers are bisphenol-A dimethacrylate with 30 ethoxy patterns (BPA30EODMA) marketed under the designations BPE-1300N by SHIN NAKAMURA CHEMICALS and SR 9036 by CRAY VALLEY Corporation, bisphenol-A dimethacrylate with 32 propoxy patterns, bisphenol-A diacrylate with 32 propoxy patterns and bisphenol-A diacrylate with 16 propoxy patterns.

The most preferred bisphenol-A oligomer is BPA30EODMA.

The oligomer of component A of the compositions according to the invention could also be a di[thio(meth)acrylate], i.e. an oligomeric compound containing two functions:

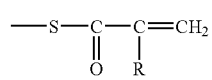

with R=H or CH$_3$ more particularly, a dithiomethacrylate represented by the formula:

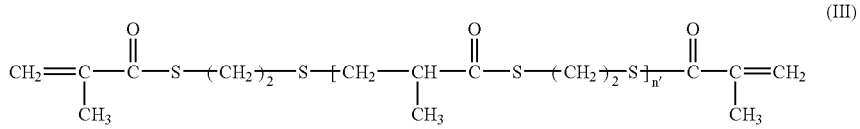

(III)

where n is an integer ranging from 1 to 10, or a blend of such dithiomethacrylates.

The oligomer of the component A could also be an urethane di(meth)acrylate. In particular are to be mentioned the aliphatic urethane diacrylates marketed by CRAY VALLEY Corporation under the designations CN934, 935, 965, 963, 966, 967, 981 and by UCB Corporation under the designations EBECRYL 230, 244, 245, 270, 284, 285, 4830, 4835, and 8800 and the aromatic urethane diacrylates marketed by CRAY VALLEY Corporation under the designations CN 970, 972, 973 and 976 and UCB Corporation under the designations EBECRYL 210, 215 and 4244.

When the oligomer of component A is an urethane di(meth)acrylate, high amounts of components B are preferably used (at least 40% in weight of the polymerizable species present in the composition).

Component A of the compositions of the invention could additionally comprise at least one other comonomer, being not an oligomer, comprising at least one radically polymerizable function and, preferably, two radically polymerizable functions.

The preferred comonomers for component A are mono- or di(meth)acrylate comonomers such as alkyl(meth)acrylates such as methyl(meth)acrylate and ethyl(meth)acrylate; cycloalkyl(meth)acrylates such as cycloethyl(meth)acrylate and dicyclopentyl(meth)acrylate; aryl(meth)acrylates such as phenyl(meth)acrylate, benzyl(meth)acrylate; naphthyl (meth)acrylates; phenoxyalkyl(meth)acrylates such as phenoxyethyl(meth)acrylate and phenoxybutyl(meth)acrylate; alkyleneglycol dimethacrylates such as ethyleneglycol di(meth)acrylate and propyleneglycol di(meth)acrylate.

Other comonomers include vinyl or polyvinyl compounds as well as allyl or polyallyl compounds such as divinylbenzene.

However, selecting such comonomers should occur so that the first component A brings, through polymerization, to a polymer or copolymer with a glass transition temperature Tg equal to or lower than 50° C.

The second component B is preferably a monofunctional compound and more particularly a compound represented by the formula:

CH$_2$=C(R)—Z—Z'    (IV)

wherein R represents H or CH$_3$, Z represents a single covalent link or a spacer group.

Z is preferably a divalent hydrocarbon chain, optionally interrupted by one or more heteroatoms, preferably selected amongst O, S, N or by one or more groups as follows:

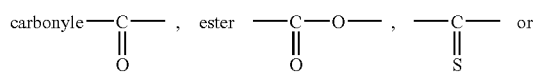

by one or more divalent groups selected amongst:

—NH—CO—NH—
—NHCOO—
—NHCOS—
—NHCSS—.

Still preferably, the hydrocarbon chain is a short chain and comprises from 1 to 10 carbon atoms and more preferably from 1 to 6 carbon atoms.

As an example, the spacer group Z could be a polyether, polyester, polyurethane, polyurea, polythiourethane group.

Z' is a monovalent short chain, preferably comprising from 1 to 10 carbon atoms, and more preferably from 1 to 6 carbon atoms and includes at least one H link promoting group selected amongst the groups:

—COOH
—OH
—CONHR'
—NHCONHR''
—NHCOOR'''
—NHCOSR$^{iv}$
—NHR$^v$ where R', R'', R''', R$^{iv}$, R$^v$ represent, independently from one another, H or an alkyl with from 1 to 10 carbon atoms or aryl with from 6 to 10 carbon atoms.

The alkyl group could be itself aliphatic or cycloaliphatic.

Preferably, the alkyl group represents represents CH$_3$.

Preferably, Z' represents a H link promoting group selected amongst COOH, OH and CONHR' groups, preferably a COOH group.

Preferably, R is CH$_3$.

The H link promoting group in the compound with formula IV could also be, on its own, a carbonyl function and/or a tertiary amine function. In such a case, both those functions interact with the above-mentioned functions for Z' and all comprising a polar link of the X—H type (X=O, S, N . . . ) for forming hydrogen links. The carbonyl and tertiary amine functions could therefore be used as a complement of the above-mentioned H link promoting functions.

The preferred monofunctional monomers having hydrogen link precursor groups are methacrylic acid (AMA), acrylic acid (AA) and (meth)acrylic monoesters of carboxylic diacids such as mono-2-(methacryloyloxy)ethylsuccinate (MA succinate) represented by the formula:

CH$_2$=C(CH$_3$)CO$_2$CH$_2$CH$_2$O$_2$CCH$_2$CH$_2$CH$_2$CO$_2$H    (a)

and mono-2-(methacryloyloxy)ethylphthalate (MA phthalate) represented by the formula:

2—[CH$_2$=C(CH$_3$)CO$_2$CH$_2$CH$_2$O$_2$C]C$_6$H$_4$CO$_2$H    (b)

Preferably, component B is methacrylic acid.

Still preferably, components A and B are only methacrylic compounds.

The compositions according to the invention also comprise a polymerization priming system. The polymerization priming system could comprise one or more thermal or photochemical polymerization primers. Such primers are well known in the art and any conventional primer could be used.

Amongst such thermal polymerization primers useful in the present invention are to be mentioned peroxides such as benzoyl peroxide, cyclohexyle peroxydicarbonate and isopropyl peroxydicarbonate.

Amongst the photoprimers are to be mentioned, more particularly, 2,4,6-trimethylbenzoyldiphenylphosphine oxide, 1-hydroxycyclo-hexylephenylketone, 2,2-dimethoxy-1,2-diphenylethan-1-one and alkyl benzoyl ethers.

In general, primers are used in a proportion ranging from 0.01 to 5% in weight based on the total weight of the polymerizable monomers contained in the composition.

The polymerizable compositions according to the invention could also comprise additives conventionally used in polymerizable compositions for moulding optic or ophthalmic items, in particular glass lenses and lenses, in the conventional proportions, i.e. release agents, inhibitors, dyes, UV absorbers, perfumes, deodorizing agents, antioxidants, anti-yellowing agents and photochromic compounds.

The use of H link promoting component B has the advantage to stiffen the very flexible network formed by component A, without, however, introducing a too high cross-linking density which would be detrimental to the shock resistance of the final material. Thus, the polymerized materials according to the invention have the required thermo-mechanical properties, i.e. a good stiffness at 25° C., which is the use temperature for the lenses, and at 100° C. which is the temperature reached at various steps of the method for manufacturing the glass and upon subsequent processings (coloration, polishing). The materials obtained from the compositions according to the invention have an elastic modulus (E') at 100° C. of at least 40 MPa, preferably 100 MPa and more preferably of at least 120 MPa, or most preferably 150 MPa.

Preferably, the compositions according to the invention are photopolymerisable compositions and the materials obtained through the polymerization of compositions according to the invention are preferably organic lenses obtained through conventional moulding, preferably through photopolymerization.

As previously indicated, the lens could be a semi-finished lens, that is that one face thereof is still to be surfaced into its final geometry, but obviously, the method could equally apply to manufacturing a finished lens, i.e. comprising both optical faces at the required geometry at the end of the moulding operation.

A finished lens can thereby be obtained at the shortest notice through photopolymerization using conventional photopolymerization devices, in a much easier way to implement and to control than in the case of a polycondensation.

The resulting lenses have an excellent shock resistance as well as a very low water absorption.

The following examples illustrate the present invention. In the examples, unless otherwise indicated, all the percentages and parts are in weight.

EXAMPLE 1

60 g of BPA30EODMA are mixed with 40 g of methacrylic acid at room temperature. Mixing is performed, 0.1 g of CGI 819® is added (phosphine oxide photoprimer from Ciba). The composition is obtained in a room with a controlled lighting in a smoky glass vial.

The thus prepared composition is cast into a mould in two mineral glass parts previously cleaned with soda, parallely assembled by means of a Bamier adhesive tape and two millimetre apart.

Casting occurs as follows:
the composition is taken out using a sterile syringe (20 ml);
the adhesive tape is partially dismantled so as to create an opening;
the tip of the syringe is inserted into the opening;
the composition is injected into the mould; and
the adhesive tape is replaced in order to sealingly close the mould.

The filled mould is then put in a photochemical polymerization oven comprising two UV prima lamps (mercury lamps) arranged on both sides at equal distance of the mould parts, the mould receiving from each lamp an illumination of approximately 40 milliwatt for 30 seconds.

The infrared measurements allow to follow the conversion of double (meth)acrylic links as a function of the UV irradiation time. After 30 seconds of irradiation, the conversion is completed.

After polymerization, the adhesive tape is removed. The lenses are then released and then checked with an arc lamp.

A final annealing operation at 120° C. allows to bring the polymerization to completion and to release the residual constraints of the resulting substrate.

The results are indicated in table 1 hereinbelow.

COMPARATIVE EXAMPLES C1 AND EXAMPLES 2 to 4

Example 1 is repeated varying the methacrylic acid and BPA 30EODMA proportions. The proportions of the starting components as well as the results are indicated in table 1 hereinbelow.

Comparative example C1 comprises BPA30EODMA as polymerizable monomer.

TABLE I

|  | C1 | EX1 | EX2 | EX3 | EX4 |
|---|---|---|---|---|---|
| Polymerizable composition (liquid) |  |  |  |  |  |
| BPA 30EODMA (%) | 100 | 60 | 50 | 45 | 70 |
| AMA (%) | 0 | 40 | 50 | 55 | 30 |
| Release agent[1] (%) | 0 | 0 | 0.1 | 0.1 | 0.1 |
| UV absorber[2] (%) | 0 | 0 | 0.07 | 0 | 0 |
| Photopolymerization primer[3] (%) | 0.1% | 0.1% | 0.1% | 0.1% | 0.1% |
| $n_D$ (25° C.) | 1.491 | 1.470 | 1.464 | 1.460 | 1.456 |
| Density | — | — | 1.08 | 1.06 | — |
| Solid polymerized material |  |  |  |  |  |
| $n_e$ (25° C.) | — | 1.516 | 1.518 | 1.515 | 1.517 |
| $v_e$ (25° C.) | — | 48 | 49 | 55 | 53 |

TABLE I-continued

|  | C1 | EX1 | EX2 | EX3 | EX4 |
|---|---|---|---|---|---|
| Density | 1.16 | 1.23 | 1.25 | 1.25 | 1.26 |
| E' at 25° C. (MPa) | — | 1,600 | 3,560 | 4,000 | 4,500 |
| E' at 100° C. (MPa) | — | 140 | 1,300 | 1,600 | 2,200 |
| Tg (° C.) | −30 | 40 | — | 160 | >160 |

[1]ZELECUN (lubricant from DUPONT CHEMICALS)
[2]UV 5411: 2-(2-hydroxy-5'-t-octylphenyl)benzotriazole from AMERICAN CYANAMID Corporation
[3]CGI 819 ® from CIBA GEIGY Corporation
(The amounts of release agent, UV absorber and photopolymerization primer are indicated in % based on 100 parts in weight of components A and B.)

The starting molecule BPA30EODMA (BPE-1300N from Shin Nakamura Chemical) is a bifunctional compound, the homopolymer of which is very flexible (Tg=−30° C. measured through differential scanning calorimetry).

Stiffening of the network is illustrated by the increasing values of E' (25° C.), E' (100° C.) and Tg upon the introduction of methacrylic acid. From 50% of methacrylic acid, the obtained Tg is higher than 150° C., which is particularly high for an acrylic thermo-hardened network.

The density of the solid material is relatively high, illustrating the intensity of interactions of the hydrogen link type.

Introducing methacrylic acid into the system limits the network water uptake. However, introducing high rates of highly polar acidic function should result in an increased hydrophilic character. Such behaviour shows that acidic links strongly interact within the polymeric network and are no longer available for interactions with water molecules from the outer environment.

COMPARATIVE EXAMPLE C2 AND EXAMPLE 5

The same procedure as in example 1 is used, but substituting the BPA30EODMA oligomer for a urethane diacrylate oligomer CN965 from CRAY VALLEY Corporation. As a comparison, said urethane diacrylate has been polymerized in the absence of acrylic acid. The compositions and results are given in table II hereinafter:

TABLE II

|  | C2 | EX5 |
|---|---|---|
| Polymerizable composition (liquid) | | |
| Urethane acrylate (CN 965) | 100 | 60 |
| AA | 0 | 40 |
| Release agent | 0 | 0.5 |
| UV absorber | 0 | 0 |
| Photopolymerization primer | 0.1 | 0.1 |
| Solid polymerized material | | |
| $n_e$ (25° C.) | 1.4922 | 1.5031 |
| $v_e$ (25° C.) | 55.2 | 54.5 |
| Density | — | 1.23 |
| E' at 25° C. (MPa) | — | 1500 |
| E' at 100° C. (MPa) | — | 180 |
| Tg (° C.) | −30 | 125 |

COMPARATIVE EXAMPLE C3 AND EXAMPLES 6, 7 AND 8

Example 1 is repeated by substituting BPA30EODMA for PPG 400 DMA in various proportions. The compositions and results are given in table III hereinafter.

TABLE III

|  | C3 | EX6 | EX7 | EX8 |
|---|---|---|---|---|
| Polymerizable composition (liquid) | | | | |
| PPG400DMA (%) | 100 | 80 | 70 | 40 |
| AMA (%) | — | 20 | 30 | 60 |
| Release agent (%) | 0 | 0 | 0 | 0.1 |
| UV absorber (%) | 0 | 0 | 0 | 0 |
| Photopolymerization primer[3] (%) | 0.1 | 0.1 | 0.1 | 0.1 |
| $n_D$ (25° C.) | 1.450 | 1.44 | 1.45 | 1.45 |
| Density | 1.01 | 1.01 | 1.01 | 1.02 |
| Polymerized material (solid) | | | | |
| $n_e$ (25° C.) | 1.48 | 1.492 | 1.494 | — |
| $v_e$ (25° C.) | 45 | 57 | 55 | — |
| E' at 25° C. (MPa) | — | 1,930 | — | — |
| E' at 100° C. (MPa) | — | 210 | — | — |
| Water uptake at 25° C. | 0.15 | 0.13 | — | 0.13 |
| Tg | 20 | 107 | — | — |

The results show that stiffening through methacrylic acid occurs even at low methacrylic acid rates (20%) and that, on the other hand, the presence of propoxy groups allows to reach extremely low water uptake rates.

COMPARATIVE EXAMPLE C4 AND EXAMPLES 9 TO 11

The same procedure as that previously implemented is carried out, but using for component A a blend of BPA30EODMA and PPG 400 DMA oligomers.

The compositions as well as the obtained results are given in table IV hereinafter.

TABLE IV

|  | C4 | EX9 | EX10 | EX11 |
|---|---|---|---|---|
| Polymerizable composition (liquid) | | | | |
| PPG 400 DMA | 50 | 40 | 30 | 25 |
| BPA 30EODMA (%) | 50 | 40 | 30 | 25 |
| AMA | — | 20 | 40 | 50 |
| Release agent (%) | 0 | 0 | 0 | 0.1 |
| UV absorber (%) | 0 | 0 | 0 | 0 |
| Photopolymerization primer (%) | 0.1 | 0.1 | 0.1 | 0.1 |
| $n_D$ (25° C.) | 1.471 | 1.465 | 1.458 | 1.453 |
| Density | 1.07 | 1.05 | 1.05 | 1.04 |
| Polymerized material (solid) | | | | |
| $n_e$ (25° C.) | — | 1.503 | — | — |
| $v_e$ (25° C.) | — | 52 | — | — |
| E' at 25° C. (MPa) | — | — | 1,990 | 3,900 |

TABLE IV-continued

|  | C4 | EX9 | EX10 | EX11 |
|---|---|---|---|---|
| E' at 100° C. (MPa) | — | — | 440 | 1,600 |
| Tg (° C.) | <20 | — | 147 | 163 |

COMPARATIVE EXAMPLE C5 AND EXAMPLES 12 AND 13

The same procedure as used previously is implemented but using for component A a mixture of BPA30EODMA and dithiomethacrylate W oligomer made of a mixture of a first component represented by formula III (with n' ranging from 1 to 10) and a second component represented by the following formula:

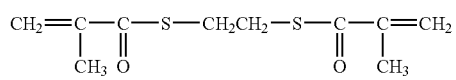

in a respective first component/second component mass ratio of 65/35. The compositions and results are shown in table V hereinafter.

TABLE V

|  | C5 | EX12 | EX13 |
|---|---|---|---|
| Polymerizable compositions (liquid) | | | |
| Dithiomethacrylate W (%) | 50 | 40 | 30 |
| BPA 30EODMA (%) | 50 | 40 | 30 |
| AMA | — | 20 | 40 |
| Release agent (%) | 0 | 0 | 0 |
| UV absorber (%) | 0 | 0 | 0 |
| Photopolymerization primer (%) | 0.1 | 0.1 | 0.1 |
| $n_D$ (25° C.) | 1.528 | 1.508 | 1.490 |
| Density | 1.16 | 1.13 | 1.10 |
| Polymerized material (solid) | | | |
| $n_e$ (25° C.) | 1.555 | 1.553 | 1.542 |
| $v_e$ (25° C.) | 42 | 44 | 48 |
| E' at 25° C. (MPa) | — | 916 | 3,840 |
| E' at 100° C. (MPa) | — | 85 | 1,140 |
| Tg (° C.) | <20 | 70 | 157 |

Stiffening by methacrylic acid is effective in all cases.

EXAMPLE 14

The above described examples are replicated using for component A a mixture of BPA30EODMA and mono-2-(methacryloyloxy)ethyl phthalate (MA phthlate) from ALDRICH Corporation.

The proportions of the components of the composition and the results are given in table VI.

TABLE VI

|  | EX13 |
|---|---|
| Polymerizable composition (liquid) | |
| BPA 30EODMA (%) | 25 |
| MA phthalate (%) | 25 |
| AMA (%) | 50 |

TABLE VI-continued

|  | EX13 |
|---|---|
| Release agent (%) | 0.1 |
| UV absorber (%) | 0 |
| Photopolymerization primer (%) | 0.1 |
| $n_D$ (25° C.) | 1.4698 |
| Density | 1.09 |
| Polymerized material (solid) | |
| $n_e$ (25° C.) | 1.5218 |
| $v_e$ (25° C.) | 44.4 |
| E' at 25° C. (MPa) | 2,070 |
| E' at 100° C. (Mpa) | 130 |
| Tg (° C.) | 155 |
| Water uptake at 25° C./30 minutes (%) | 1 |

EXAMPLE 15

Using the same procedure as previously described, spherical lenses have been manufactured with a –2 diopter power from the composition in example 2.

The resulting lenses are subjected to a shock resistance trial using an increasing energy ball drop (increasing the drop height up to break).

The results are shown in table VII hereinafter.

TABLE VII

|  | BPA30EODMA + 50% AMA (EX2) |
|---|---|
| Mean centre thickness of the tested lenses | 1.1 |
| Number of lenses broken with 520 g (ball) mass | 6 |
| Mean break energy | >5,800 mJ |

Such results show that the compositions according to the invention allow for high shock resistances to be obtained.

COMPARATIVE EXAMPLE C6

Example 2 from Patent Application WO 01/09205 is replicated in order to produce spherical lenses with a –2 dioptre power.

| Polymerizable composition | Mass % |
|---|---|
| SR 6440 P | 52 |
| * PLEX 6661-0 | 33 |
| SR 423 A (isobornyl methacrylate from CRAY VALLEY Corporation) | 15 |

* PLEX 6661-0 from CRAY VALLEY Corporation has the following formula:

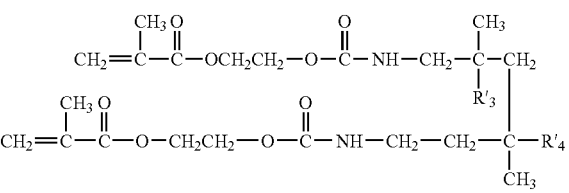

with R'$_3$ and R'$_4$ representing independently from each other H or CH$_3$.

The resulting lenses, with a −2 dioptre power and a centre thickness of 1.1 mm, are subjected to a shock resistance trial, using the same protocol as in example 15.

Results

| Number of lenses broken with 520 g (ball) mass | 31 |
|---|---|
| Mean break energy | 3,300 mJ |

The invention claimed is:

1. A radically polymerizable composition comprising:
    a first component A comprising at least an oligomer having at least two radically polymerizable functions, which, when polymerized, form a homopolymer of which has a glass transition temperature (Tg) lower than 50° C., such a component being able to result through polymerization in a (co)polymer having a glass transition temperature (Tg) equal to or lower than 50° C., said oligomer accounting for more than 15%, of the total weight of the polymerizable monomers present in the composition; and
    a second component B comprising at least a (meth)acrylic monomer having at least one H link promoting group, such a (meth)acrylic monomer accounting for at least 15% of the total weight of the polymerizable monomers and oligomers present in the composition when such a monomer is a methacrylic monomer and at least 35% of the total weight of such polymerizable monomers and oligomers present in the composition when such a monomer is an acrylic monomer and represented by the formula:

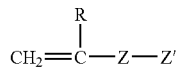

wherein R represents H or CH3;
Z represents a single covalent link or a divalent spacer group; and
Z' is the H link promoting group selected from:
    —COOH, —CONHR',
    —NHCONHR", —NHCOOR'", —NHCOSR$^{iv}$ and —NHR$^v$
wherein R, R", R'", R$^{iv}$ and R$^v$ represent, independently from each other, H or a $C_1$-$C_{10}$ alkyl group or a $C_6$-$C_{10}$ aryl group.

2. The composition of claim 1, wherein the oligomer of the first component A is a difunctional oligomer.

3. The composition of claim 2, wherein the oligomer is a di(meth)acrylate.

4. The composition of claim 2, wherein the oligomer is a dim ethacrylate.

5. The composition of claim 1, wherein the oligomer has a number average molecular mass Mn ranging from 100 to 5,000 g.mol-1.

6. The composition of claim 5, wherein the oligomer has a number average molecular mass Mn ranging from 200 to 4000 g.mol-1.

7. The composition of claim 6, wherein the oligomer has a number average molecular mass Mn ranging from 300 to 2,000 g.mol-1.

8. The composition of claim 1, wherein the copolymer has a glass transition temperature (Tg) equal to or lower than 0° C.

9. The composition of claim 8, wherein the copolymer has a glass transition temperature (Tg) ranging from −50° C. to −10° C.

10. The composition of claim 1, wherein said oligomer of component A accounts for at least 20% of the total weight of polymerizable monomers present in the composition.

11. The composition of claim 1, wherein the oligomer is poly(alkylene)glycol di(meth)acrylates, polyethoxy bisphenol-A dimethacrylates, dithio(meth)acrylates or urethane di(meth)acrylate.

12. The composition of claim 1, wherein the oligomer is poly(ethyleneglycol) dimethacrylates and poly(propyleneglycol) dimethacrylates.

13. The composition of claim 12, wherein the oligomer is a poly(propyleneglycol) dimethacrylate with a number average molecular mass of approximately 530 g.mol-1.

14. The composition of claim 1, wherein the first component A comprises additionally at least one other comonomer, being not an oligomer, comprising at least one radically polymerizable function.

15. The composition of claim 1, wherein the radically polymerizable function is a (meth)acrylate function.

16. The composition of claim 1, wherein the H link promoting (meth)acrylic monomer is a monofunctional monomer.

17. The composition of claim 16, wherein the H link promoting (meth)acrylic monomer is acrylic acid, methacrylic acid, mono-2-(methacryloyloxy)ethyl succinate or mono-2-(methacryloyloxy)ethyl phthalate.

18. The composition of claim 1, wherein the Z is a divalent hydrocarbon chain.

19. The composition of claim 18, wherein the divalent hydrocarbon chain is interrupted by one or more heteroatom or by one or more groups as follows:

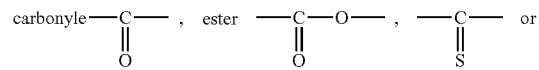

by one or more divalent groups of formula:
    —NH—CO—NH—;
    —NH—COO—;
    —NHCOS—; or
    —NHCSS—.

20. The composition of claim 19, wherein the one or more heteroatom is O, S and N.

21. The composition of claim 18, wherein the hydrocarbon chain comprises from ito 1 to 10 carbon atoms.

22. The composition of claim 21, wherein the hydrocarbon chain comprises from 1 to 6 carbon atoms.

23. The composition of claim 1, wherein the Z is a polyether, polyester, polyurethane, polyurea or polyurethane group.

24. The composition of claim 1, wherein the alkyl group is an aliphatic or cycloaliphatic group.

25. The composition of claim 1, wherein the aliphatic group is —CH3.

26. The composition of claim 1, wherein Z' is the —COOH group.

27. The composition of claim 1, wherein R is CH3.

28. The composition of claim 1, wherein it additionally comprises an effective amount of at least one thermal and/or photochemical polymerization primer.

29. A product resulting from the thermal and/or photochemical polymerization of a composition comprising:
    a first component A comprising at least an oligomer having at least two radically polymerizable functions, which, when polymerized, form a homopolymer of which has a glass transition temperature (Tg) lower than 50° C., such a component being able to result through polymerization in a (co)polymer having a glass transition temperature (Tg) equal to or lower than 50° C., said oligomer accounting for more than 15%, of the total weight of the polymerizable monomers present in the composition; and a second component B comprising at least a (meth)acrylic monomer having at least one H link promoting group, such a (meth)acrylic monomer accounting for at least 15% of the total weight of the polymerizable monomers and oligomers present in the composition when such a monomer is a methacrylic monomer and at least 35% of the total weight of such polymerizable monomers and oligomers present in the composition when such a monomer is an acrylic monomer and represented by the formula:

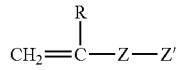

wherein R represents H or CH3

Z represents a single covalent link or a divalent spacer group; and

Z' is the H link promoting group selected from:
—COOH, —CONHR',
—NHCONHR", —NHCOOR''', —NHCOSR$^{iv}$ and—NHR$^{v}$ wherein R, R", R''', R$^{iv}$ and R$^{v}$ represent, independently from each other, H or a $C_1$-$C_{10}$ alkyl group or a $C_6$-$C_{10}$ aryl group.

30. The product of claim 29, wherein it has an elastic modulus E' at 100° C. of at least 40 MPa.

31. The product of claim 30, wherein it has an elastic modulus E' at 100° C. of at least 100 MPa.

32. The product of claim 31, wherein it has an elastic modulus E' at 100° C. of at least 120 MPa.

33. The product of claim 29, further defined as an optical lens.

34. The product of claim 29, further defined as an ophthalmic, finished or semi-finished, lens.

35. The product of claim 29, wherein the copolymer has a glass transition temperature (Tg) equal to or lower than 0° C.

36. The product of claim 29, wherein the copolymer has a glass transition temperature (Tg) ranging from −50° C. to −10° C.

37. The product of claim 29, wherein said oligomer of component A accounting for at least 20% of the total weight of polymerizable monomers present in the composition.

* * * * *

UNITED STATES PATENT AND TRADEMARK OFFICE
CERTIFICATE OF CORRECTION

PATENT NO. : 7,393,880 B2  
APPLICATION NO. : 10/496743  
DATED : July 1, 2008  
INVENTOR(S) : Gilles Richard et al.

It is certified that error appears in the above-identified patent and that said Letters Patent is hereby corrected as shown below:

In title page, item (57) Abstract, line 9, delete "-10 C." and insert -- -10° C.-- therefor.

In claim 4, column 13, line 53, delete "dim ethacrylate" and insert --dimethacrylate-- therefor.

In claim 21, column 14, line 46, delete "ito".

In claim 29, column 15, line 24, insert --;-- after "CH3".

Signed and Sealed this

Twenty-third Day of September, 2008

JON W. DUDAS  
*Director of the United States Patent and Trademark Office*